United States Patent

[11] 3,628,260

[72] Inventor Nathaniel J. Jacobsen
 7 Harvard St., Brookline, Mass. 02146
[21] Appl. No. 78,644
[22] Filed Oct. 6, 1970
[45] Patented Dec. 21, 1971
 Continuation of application Ser. No.
 694,736, Dec. 29, 1967, now abandoned.
 This application Oct. 6, 1970, Ser. No.
 78,644

[54] FINE AND GRAPHIC ARTS PRODUCTS FOR ENABLING AMATEURS AND OTHERS TO SELECT AND UTILIZE COLOR MATERIALS WITH OPTICAL RESULTS OF INCREASED PREDICTABILITY
 2 Claims, 7 Drawing Figs.

[52] U.S. Cl. .................................................. 35/28.5
[51] Int. Cl. ............................................... G09b 11/00
[50] Field of Search ............................................ 35/28.3, 28.5

[56] References Cited
 UNITED STATES PATENTS
 1,957,816  5/1934  Braeg ............................. 35/28.3 X
 2,007,264  7/1935  Allen .............................. 35/28.3
 824,374   6/1906  Munsell ........................... 35/28.5
 2,878,590  3/1959  Dodge ............................. 35/28.5
 FOREIGN PATENTS
 233,428   9/1958  Australia ......................... 35/28.5
 796,256   6/1958  Great Britain .................... 35/28.5

Primary Examiner—Harland S. Skogquist
Attorney—Morse, Altman & Oates

ABSTRACT: A limited number of predetermined, systematically identified color materials are predeterminedly arranged in an array of distinguishable groups of colors of like "value," with reference to the terms "hue," "value" and "chroma" as used in the "Munsel, Color System" (or with reference to equivalent terms as used in analogous systems). The user, in working with the array, efficaciously is enabled to create a particular color of predicted optical character by mixing given colors from a particular group of premixed colors of like "-value."

PATENTED DEC 21 1971 3,628,260

INVENTOR.
Nathaniel J. Jacobson
BY Morse, Altman & Oates
ATTORNEYS

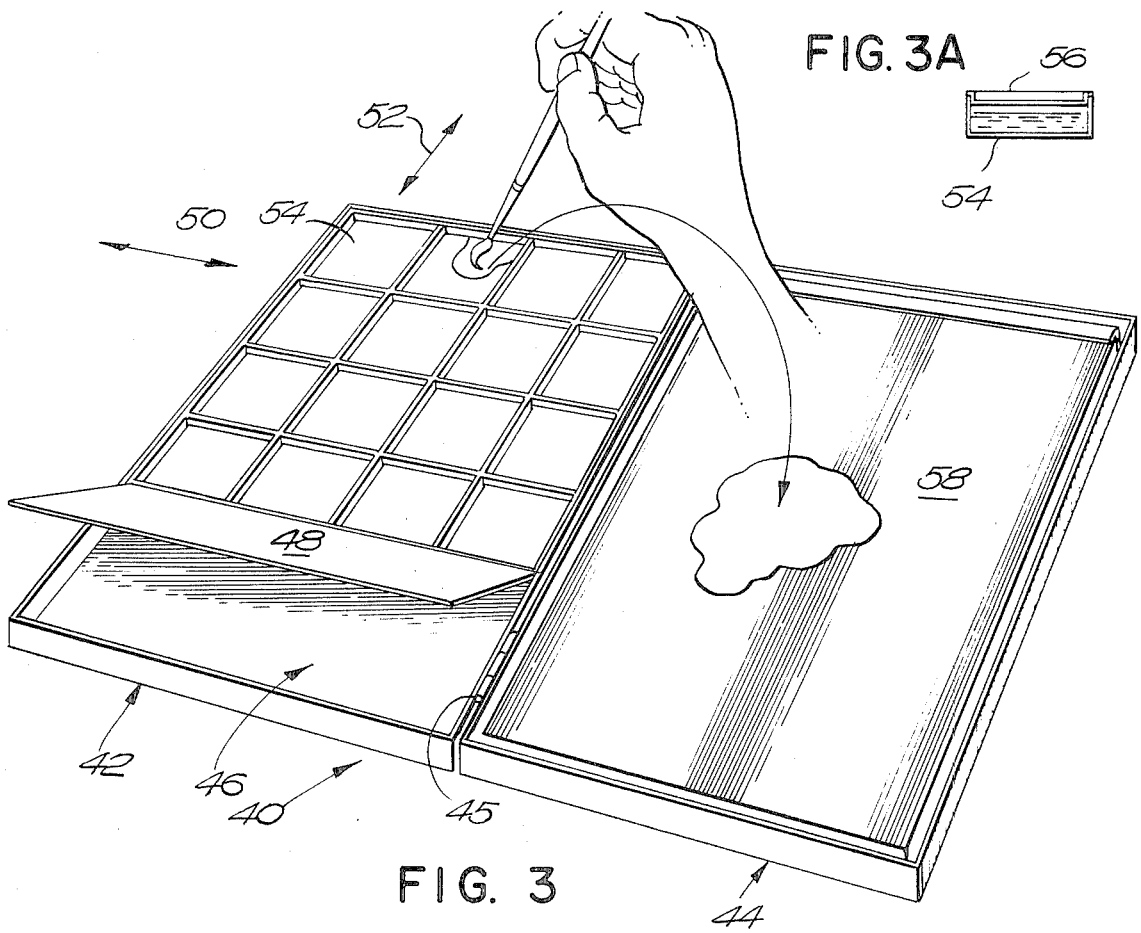
FIG. 3
FIG. 3A
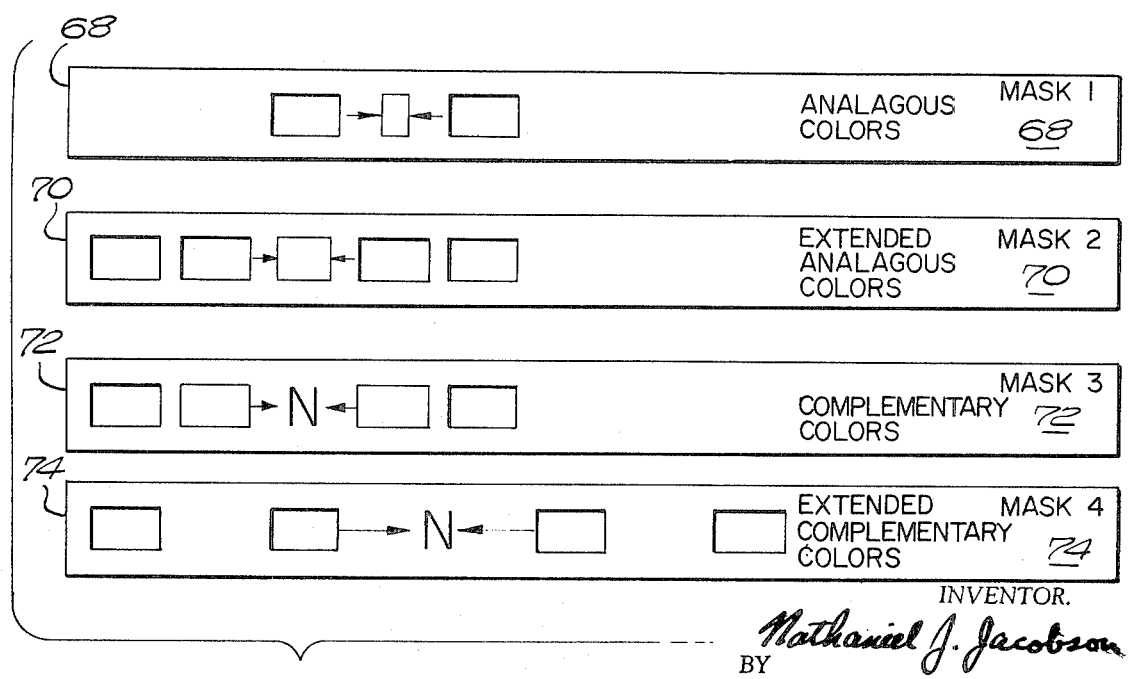
FIG. 4b

FINE AND GRAPHIC ARTS PRODUCTS FOR ENABLING AMATEURS AND OTHERS TO SELECT AND UTILIZE COLOR MATERIALS WITH OPTICAL RESULTS OF INCREASED PREDICTABILITY

This application is a continuation of copending U.S. Ser. No. 694,736, filed Dec. 29, 1967, and now abandoned.

BACKGROUND AND SUMMARY OF THE INVENTION

The present invention relates to the fine and graphic arts and, more particularly, to products for enabling amateurs and others to select and utilize color materials, with optical results of increased predictability.

Although the science of color has undergone considerable development, difficulties have been encountered in enabling amateurs and others to apply existing theoretical knowledge in a practical manner. An amateur painter, for example, typically has acquired a supply of different pigments, whose range of colors have been limited by the inherent chemical characteristics traditionally available. This range of colors bears little direct relationship to either recent optical-chemical advances or to a conceptual understanding of the order of color and its theoretical possibilities in composition. Only after long and costly experience in dealing with the complexity of mixing random pigments or like materials is the painter able to achieve his desired color objectives. The present invention contemplates enabling a user to apply existing theoretical knowledge inherently by the provision of a specific organization of premixed, measured, color materials. Many systems have been developed for the purpose of making a theoretical organization of the characteristics of color. These have involved the establishment of common terms for color notation and communication. While this invention is compatible with all systems of measured color arrangements, the specific notations presently employed in identifying the visual color factors of color media are identical with those used in the Munsell Color System. The physical terms "hue," "value" and "chroma," as defined in the Munsell Color System, are used below to characterize the color materials described—hue referring to the position of a color sensation in the spectrum (e.g. blue, blue-green, etc.), value referring to the luminosity of a color in comparison with a measured standard of varying degrees of light and dark (i.e. ability to evoke the sensation of brightness in the human eye), and chroma referring to the purity of a color (i.e. the degree of departure of a color sensation from neutral gray toward the most intense color sensation of a particular position in the spectrum). Again it will be understood that analogous terms of other color systems could be substituted for the terms used herein.

It has been found that predicting the color that will result from mixing two or more known colors is relatively simple and easy when the known colors being premixed are of the same value and is relatively complex and difficult when the known colors are not of the same value. The present invention takes advantage of this fact by organizing color materials in such a way as to inherently program the selection of given colors for mixing in order to achieve predicted color results. The primary object of the present invention is to provide a kit of containers of color materials, a palette supporting color materials, a chart displaying color materials, or the like, in which the color materials are positioned mechanically in an array of visually isolated groups of different colors, the values of the colors within any group being substantially the same and the values of the colors of different groups being different. Typically such an array includes between four and eight groups of between three and six colors, each group having a different value. Preferably each group contains the colors yellow, blue-purple, red and green, which have been found to possess extreme versatility for mixing, when of like value.

Other objects of the present invention will in part be obvious and will in part appear hereinafter.

The invention accordingly contemplates the products characterized by components, characteristics and relationships, the scope of which will be indicated in the appended claims.

BRIEF DESCRIPTION OF THE DRAWING

For a fuller understanding of the nature and objects of the present invention, reference is to be had to the following detailed description, taken in connection with the accompanying drawings, wherein:

FIG. 3 and 3A is a palette embodying the present invention; and

FIG. 4, 4A and 4B is a color chart with overlays and masks in accordance with the present invention.

DETAILED DESCRIPTION

Figure 1:
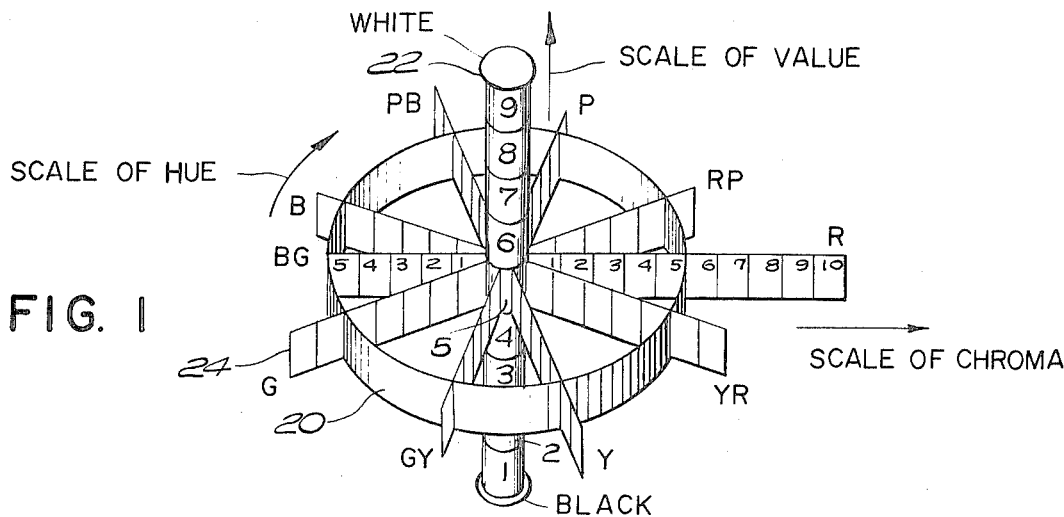
FIG. 1 illustrates certain principles of color notation upon which the present invention is based.

As suggested above, the Munsell Color System is a scientific technique for describing and analyzing color in terms of three physical attributes, identified as hue, value and chroma. This system, as described in U.S. Pat. No. 824,374, June 26, 1906 in the name of Albert H. Munsell for Color Chart or scale, arranges the three attributes of color into orderly scales of equal visual steps, so that the attributes are dimensions or parameters by which color may be analyzed and described accurately under standard conditions of illumination. FIG. 1 diagrammatically illustrates the relationships among these physical attributes in three dimensions. Hue is shown as a circular band 20 in a horizontal plane. The hue of a color indicates its relation to the five principal hue terms, red, yellow, green, blue and purple, which with five subdivisions, yellow-red, green-yellow, blue-green, purple-blue and red-purple, constitute the 10 major hue terms. Value is shown as an axial post 22 in vertical relation to the plane of band 20. The value of a color indicates the degree of lightness or darkness of a color in relation to a neutral gray scale, designated by N which N 0/ extends from a theoretically pure black symbolized by N 0/ to a theoretically pure white symbolized as N 10/. A gray or a chromatic color that appears visually halfway in lightness between pure black and pure white has a value notation of 5/. Lighter colors are indicated by numbers ranging above five, while darker ones are indicated by numbers ranging below five. Chroma is shown as angularly radiating spokes 24 extending from post 22 through band 20. Chroma indicates the saturation or degree of departure of a particular hue from a neutral gray of the same value. The scales of chroma extend from /0 for a neutral gray out to /14 or farther, depending upon the strength of the individual color. A color classified popularly as "vermillion" might have a chroma as strong as /12 while another color of the same hue and value classified popularly as "rose" might have a chroma as weak as /4. The complete notation for any chromatic color is written hue value/chroma, or symbolically H V/C. A particular sample of vermillion might then have a Munsell notation of R 5/12.

Figure 2:
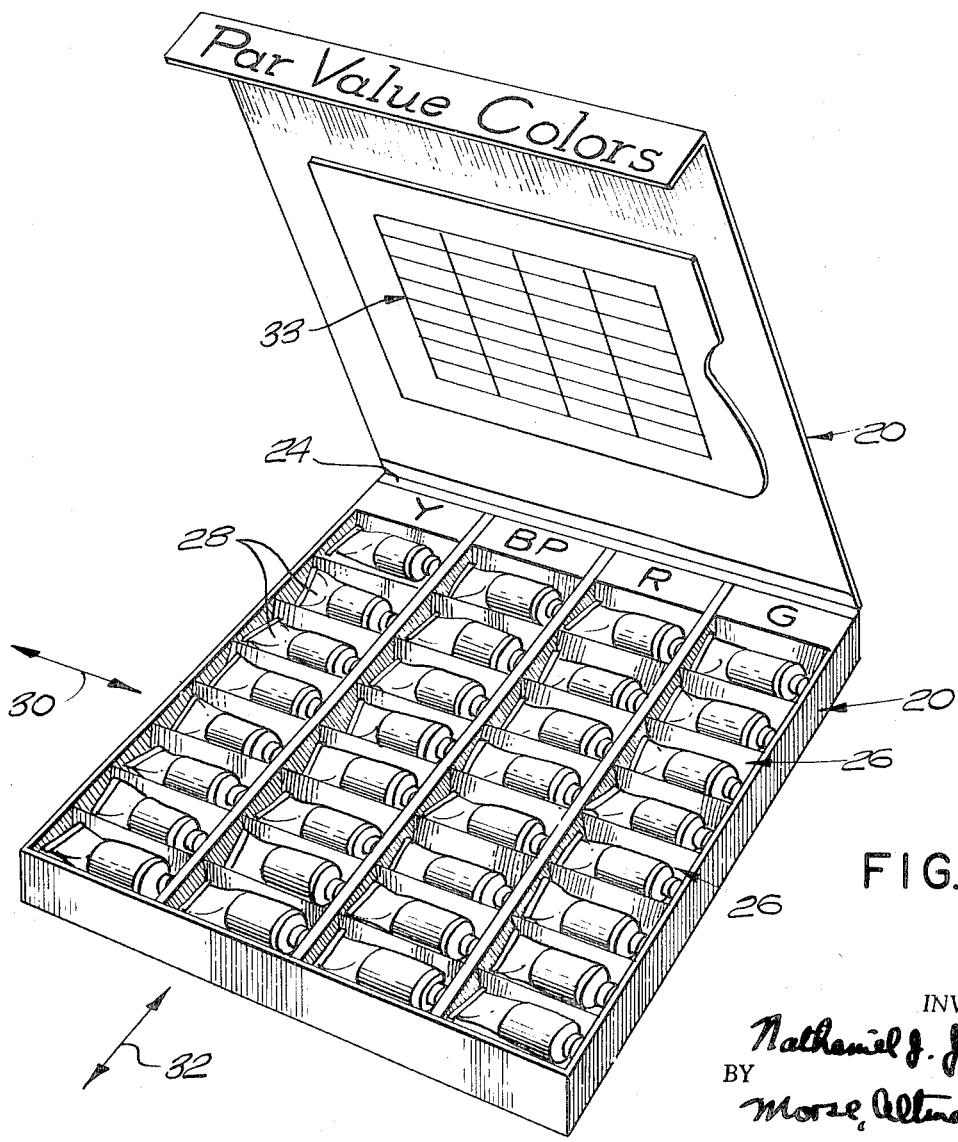
FIG. 2 is a kit of pigments embodying the present invention.

The kit of FIG. 2 consists of a cabinet having a base 20 in the form of an open top box and a cover 22 in the form of a flap hinged together along an edge as at 24. Both the base and the cover are composed, for example, of cardboard. Within base 20 are a series of racks 26 that are provided with partitions for the reception of tubes 28 of oil base pigment. The tubes are arranged in eight rows 30 and four columns 32, the tubes of any row being of the same value and the tubes of different rows being of different values. A chart 33 having rows and columns of blocks corresponding to the rows and columns of tubes 28, is such that each block carries a Munsell color designation corresponding to the Munsell color designation of its corresponding tube. In the illustrated embodiment the pigments are characterized as follows:

TABLE 1

| Column Row | 1 | 2 | 3 | 4 |
|---|---|---|---|---|
| 1 | Y 9/12 | BP 9/2 | R 9/4 | G 9/6 |
| 2 | Y 8/14 | BP 8/4 | R 8/6 | G 8/8 |
| 3 | Y 7/12 | BP 7/6 | R 7/10 | G 7/10 |

| | | | | |
|---|---|---|---|---|
| 4 | Y 6/8 | BP 6/8 | R 6/14 | G 6/12 |
| 5 | Y 5/6 | BP 5/10 | R 5/14 | G 5/12 |
| 6 | Y 4/4 | BP 4/12 | R 4/12 | G 4/10 |
| 7 | Y 3/2 | BP 3/10 | R 3/10 | G 3/6 |
| 8 | Y 2/2 | BP 2/8 | R 2/6 | G 2/4 |

It will be observed that the kit of FIG. 2 includes a replete selection of basic colors from which a large variety of intermediate colors may be synthesized. More specifically, the selection of the four colors yellow (Y), blue-purple (BP), red (R) and green (G) is based on the following considerations. BP, R and G are the primary colors in light, so that, in light mixtures, all parts of the spectrum can be produced by their selected admixtures. In the physical mixtures of most pigments presently available, Y does not result in a strong chroma when the two components R and G are mixed to form it. Thus Y is added to the palette selection.

The palette of FIG. 3 is in the form of a support 40, composed, for example, of wood or pressed cardboard, having left and right sections 42, 44 hinged together at 45 so that they can be folded to a closed compartment for portability. Section 42 has a storage compartment 46 with a closure 48 and provides four rows 50 and four columns 52 of wells 54. Wells 54 in one form contain dispersions or solutions of pigments or dyes in an oil vehicle. Wells 54 in another form contain dispersions or solutions of pigments or dyes in a water vehicle. Wells 54 are provided with snap-on caps 56 for maintaining them hermetically sealed when not in use. A pad of paper 58 is affixed to section 44 for use in mixing colors. In the illustrated embodiment, the pigments are characterized as follows:

TABLE 2

| Column Row | 1 | 2 | 3 | 4 |
|---|---|---|---|---|
| 1 | Y 8/14 | BP 8/4 | R 8/6 | G 8/8 |
| 2 | Y 6/8 | BP 6/8 | R 6/14 | G 6/12 |
| 3 | Y 4/4 | BP 4/12 | R 4/12 | G 4/10 |
| 4 | Y 2/2 | BP 2/8 | R 2/6 | G 2/4 |

Figure 4:
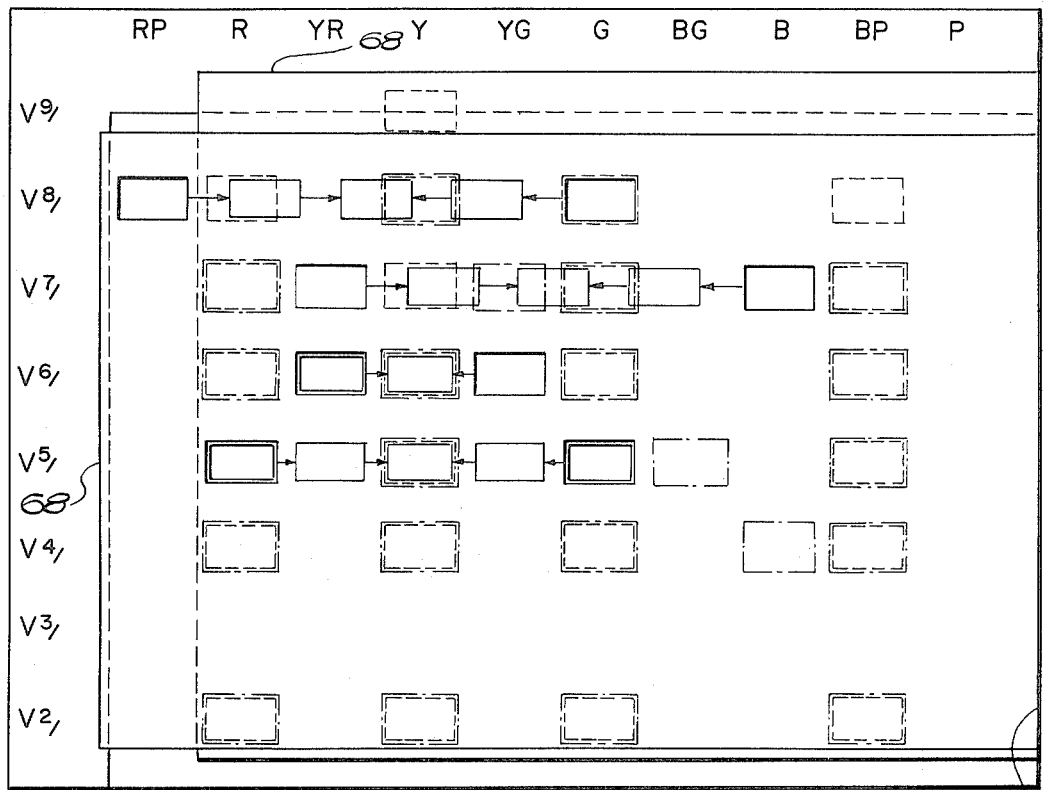
Figure 4A:
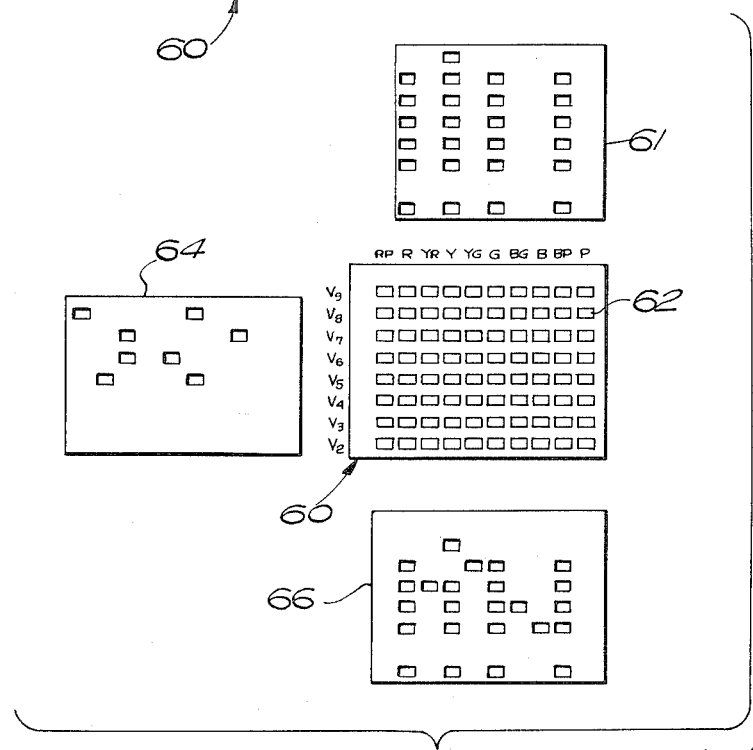

The color chart of FIG. 4 comprises a base 60, composed, for example, of still paper of cardboard and at least one overlay, in the present case three overlays 61, 64, 66, best shown in FIG. 4A, for registration therewith, by means of hinges 68 at edges of the base. Also associated with base 60 are four masks 68, 70, 72, 74, best shown in FIG. 4B. Mounted on base 60 is an array of color chips 62 arranged in 10 columns and eight rows. Color chips 62 are characterized by an ordered arrangement of hues, values and chromas. Overlays 61, 64, 66 and masks 68, 70, 72, 74 visually present distinguishably isolated and related groups of color chips of like value when folded into or placed over one or more of the positions shown in FIG. 4. In the form shown, the color chips arranged on base 60 are as follows:

color media in any particular range and to display predicted physical effects resulting from mixtures in paint of the measured color media, as well as the illusions of light mixtures produced through the juxtaposition of small particles of the illustrated selected color media. Specifically, mask 68 displays analogous colors, mask 70 displays extended analogous colors, mask 72 displays complementary colors and mask 74 displays extended complementary colors.

OPERATION AND CONCLUSION

In operation, a user of any of the products of FIGS. 2, 3 and 4, is enabled initially to mix given colors of like value in order to achieve any predicted intermediate color of like value and then to mix the predicted intermediate color with other predicted intermediate colors similarly achieved in order to achieve a final predicted color. (The chromas in all of the foregoing tables are selected as indicated because, in using pigments, colors can reach an intensity in any value that is only a fraction of the theoretical highest intensity. The selected chromas are the highest presently available so that they can be degraded as desired to all practical chroma values.) These products, in effect, provide ordered combinations of standardized, premixed, measured colored media available for versatile use and programmed data for specific guidance. Since certain changes may be made in the foregoing disclosure without departing from the scope of the invention hereof, it is intended that all matter contained in the above description and shown in the accompanying drawing be interpreted in an illustrative and not in a limiting sense.

What is claimed is:

1. A kit for use in the fine and graphic arts, said kit comprising:
   a. an organized array of color media of predetermined hue, value, and chroma, symbolized by the notation H V/C;
   b. said hue, as quantitatively defined in accordance with the Munsell Color System, referring to the position of a color sensation in the spectrum, the hue of any indicating its relation to the 10 major hue terms, viz red, yellow, green, blue, purple, yellow-red, green-yellow, blue-green, purple-blue and red-purple;
   c. said value, as quantitatively defined in accordance with the Munsell Color System, referring to the reflectance luminosity of a color in comparison with a measured standard in the form of a neutral gray scale, designated by N, extending from a theoretically pure black symbolized by V=0 to a theoretically pure white symbolized by V=10;
   d. said chroma referring to the purity of a color in the sense of degree of departure from neutral gray toward the most intense color sensation of a particular hue, the scales of chroma extending from C=0 for a neutral gray out to C=14 or farther for the pure color;
   e. selected groupings of selected color media being isolated from other groupings of color media, each of said color media in any such selected grouping being characterized by the same value as so quantitatively defined;

TABLE 3

| Columns | RP | R | YR | Y | YG | G | BG | B | BP | P |
|---|---|---|---|---|---|---|---|---|---|---|
| Rows: | | | | | | | | | | |
| V 9/ | RP 9/2 | R 9/4 | YR 9/6 | Y 9/12 | YG 9/10 | G 9/6 | BG 9/6 | B 9/4 | BP 9/2 | P 9/2 |
| V 8/ | RP 8/4 | R 8/6 | YR 8/10 | Y 8/14 | YG 8/12 | G 8/9 | BG 8/8 | B 8/6 | BP 8/4 | P 8/4 |
| V 7/ | RP 7/6 | R 7/10 | YR 7/12 | Y 7/12 | YG 7/14 | G 7/10 | BG 7/10 | B 7/10 | BP 7/6 | P 7/4 |
| V 6/ | RP 6/8 | R 6/14 | YR 6/14 | Y 6/8 | YG 6/12 | G 6/12 | BG 6/12 | B 6/12 | BP 6/8 | P 6/8 |
| V 5/ | RP 5/10 | R 5/14 | YR 5/12 | Y 5/6 | YG 5/10 | G 5/12 | BG 5/14 | B 5/14 | BP 5/10 | P 5/10 |
| V 4/ | RP 4/10 | R 4/12 | YR 4/10 | Y 4/4 | YG 4/6 | G 4/10 | BG 4/12 | B 4/14 | BP 4/12 | P 4/12 |
| V 3/ | RP 3/6 | R 3/10 | YR 3/6 | Y 3/2 | YG 3/4 | G 3/6 | BG 3/8 | B 3/12 | BP 3/10 | P 3/8 |
| V 2/ | RP 2/4 | R 2/6 | YR 2/4 | Y 2/2 | YG 2/2 | G 2/4 | BG 2/6 | B 2/8 | BP 2/8 | P 2/6 |

As shown the indicated positions of the openings in overlays 61, 64, 66 expose predeterminately related chips 62 and the indicated positions of the openings in masks 68, 70, 72, 74 expose selectively related chips 62 based on the freely determined positions of the masks on the chart. In other words, the overlays and masks serve to facilitate the choice of measured f. and visual partitioning means isolating said selected grouping from said other groupings;
   g. said media being in the form of fluid colorants;
   h. said visual partitioning means including holding means for removably positioning said media at predetermined locations within said kit.

i. said groupings each consisting of four media respectively having only the hues of yellow, blue-purple, red and green;
j. said array including between four and eight of said groupings, each of said groupings having a different value.

2. A kit for use in the fine and graphic arts, said kit comprising:
   a. an organized array of color media of predetermined hue, value, and chroma, symbolized by the notation H V/C;
   b. said hue, as quantitatively defined in accordance with the Munsell Color System, referring to the position of a color sensation in the spectrum, the hue of any indicating its relation to the ten major hue terms, viz red, yellow, green, blue, purple, yellow-red, green-yellow, blue-green, purple-blue and red-purple;
   c. said value, as quantitatively defined in accordance with the Munsell Color System, referring to the reflectance luminosity of a color in comparison with a measured standard in the form of a neutral gray scale, designated by N, extending from a theoretically pure black symbolized by $V=0$ to a theoretically pure white symbolized by $V=10$;
   d. said chroma referring to the purity of a color in the sense of degree of departure from neutral gray toward the most intense color sensation of a particular hue, the scales of chroma extending from $C=0$ for a neutral gray out to $C=14$ or farther for the pure color;
   e. selected groupings of selected color media being isolated from other groupings of color media, each of said color media in any such selected grouping being characterized by the same value as so quantitatively defined;
   f. and visual partitioning means isolating said selected grouping from said other groupings;
   g. said media being in the form of fluid colorants;
   h. said visual partitioning means including holding means for removably positioning said media at predetermined locations within said kit.
   i. said groupings each including four media, respectively designated by hue terms including yellow, blue-purple, red and green;
   j. said array including between four and eight of said groupings, each of said groupings having a different value.

* * * * *